March 5, 1968

G. H. FATHAUER 3,371,526

LOAD CELL

Filed May 5, 1965

INVENTOR.
George H. Fathauer

BY Hill, Sherman, Meroni, Gross & Simpson
ATTORNEYS

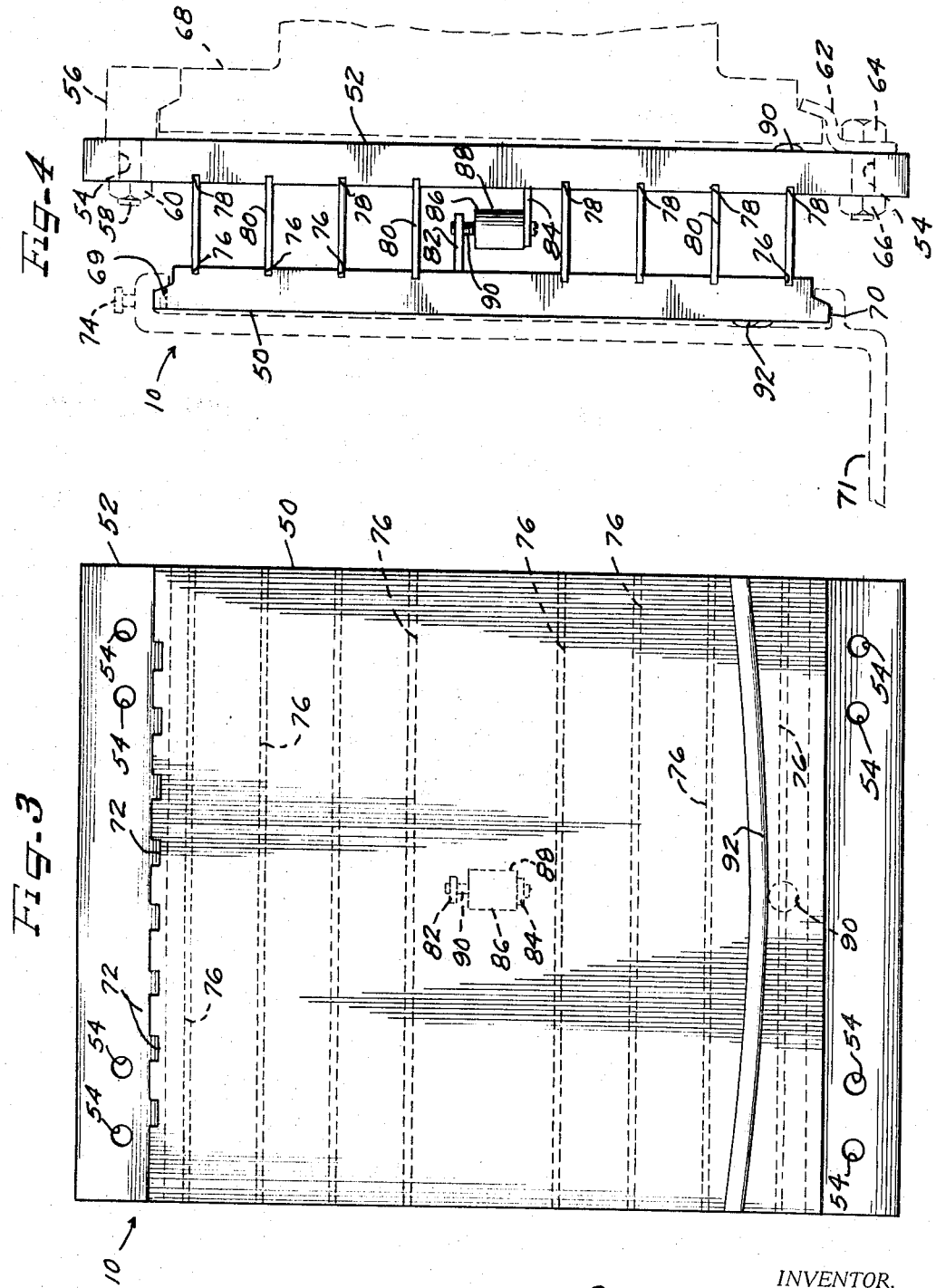

United States Patent Office 3,371,526
Patented Mar. 5, 1968

3,371,526
LOAD CELL
George H. Fathauer, Decatur, Ill., assignor to Radson Engineering Corporation, Macon, Ill., a corporation of Illinois
Filed May 5, 1965, Ser. No. 453,393
9 Claims. (Cl. 73—141)

ABSTRACT OF THE DISCLOSURE

A load cell formed of a pair of walls in parallel relation, a pair of spring members extending between the walls, and a measuring device secured between the walls to sense parallel deflection of one wall with respect to the other wall without supporting any of the force causing the deflection. A bearing button and a bearing strip can be secured to respective walls to compensate for off-set loads.

---

This invention relates generally to load cells and more particularly to a flexure type of load cell of parallelogram configuration for use in measuring off-center loads.

It has been necessary in many weighing applications to provide a measurement or indication of the weight of a load which cannot be weighed directly or on center in any practical manner. That is, the only practical manner of weighing loads in such applications is by having the load displaced a distance from the weighing device. As a result, such applications which require the use of off-center weighing cause a considerable number of problems due to the resultant moments of force which will be produced by the load being spaced from the weighing device. These problems are particularly encountered and become more pronounced in such applications as, for instance, the weighing of a load which is to be lifted by a fork lift truck.

Although it may be desirous to obtain an indication of the weight of a load placed on the fork of a lift truck, it is impractical to weigh each load prior to its placement on the fork. Therefore, an indication of the weight of a load on a fork lift truck can only be provided by an off-center load weighing device. Such devices also have application in providing an indication of the weight on the axle of a vehicle.

Although off-center load measuring devices are old in the art per se, such prior known devices have not been able to attain the high degree of accuracy required due to inherent difficulties in their structures. One such prior device employs a pair of bearing walls in parallel relationship with one another and spring members disposed between the two walls for maintaining the parallel relationship. Also disposed between the two bearing walls is a solid member which is disposed for receiving the entire weight of the load thereon. Varying degrees of loads on the solid member will cause varying degrees of compression therein and, with the use of a strain gauge, such compression can be determined for providing an indication of the load thereon. In such a prior art device, however, it is necessary that a substantial amount or all of the load is transferred to the solid member without any or very little load carrying capabilities being provided in the spring members. Therefore, such a device provides an indication of off-center loads by transferring such loads to a solid compressible member.

It is readily apparent, however, that such a device must employ spring members which will not perform to support any of the load, but only to maintain the bearing walls in the parallel relationship. As a result, these spring members cannot effectively maintain the exact parallel relationship, since one will be under tension forces and the other under compression forces with off-center loads. Therefore, as the spring members are flexed to maintain the parallel relationship between the bearing walls, the one under tension will tend to elongate while the other under compression will be shortened, thereby upsetting the parallel relationship. These difficulties become more pronounced as the spring members are designed to support a lesser amount of the weight and the solid compressible member receives the greater amount of the load. Such design presents a danger of these members failing under overload.

In order to overcome such a difficulty, the spring members must be designed to support substantially the entire weight of the load with very little load being carried by the solid compressible member. Such design and configuration, however, substantially reduces the accuracy of the device, since only a fraction of the load is being measured rather than the total amount of the load. Therefore, it can be readily appreciated that if the spring members are designed to support none of the weight of the load, the parallel arrangement between the bearing walls cannot be maintained and, if the spring members are designed to support a substantial amount of the load, accuracy of measurement is sacrificed.

The disadvantages of the prior art are overcome by the present invention which generally includes a pair of bearing walls in a parallel spaced relationship with one another, load supporting spring members disposed between the bearing walls, and means for sensing the deflection of one bearing wall relative to the other. By the employment of measuring means which senses only the deflection between the two bearing walls rather than supporting the load directly thereon, the problems of maintaining the parallel relationship between the bearing walls and the inaccuracies of prior known devices are completely eliminated.

The heretofore known load cells for off-center weighing applications have also exhibited difficulties with variations in load movement with respect to the cell. This is particularly important in the application of such load cells to a fork truck, wherein the forks would hang on the load cell in various positions, depending upon the user's application. Errors arise in such applications because of the distortion of the heavy vertical plates with the placement of a load on the forks and because of manufacturing imperfections which may make the load cell response vary with the location of the forks on the cell.

Such difficulties are eliminated by another form of the present invention which includes the provision of a load bearing button on the lower rear surface of the cell for engaging a point on the fork truck mounting plate or similar mounting structure in other applications. The improvement also includes the provision of a load bearing strip on the lower front surface of the cell for engaging and supporting the forks which are suspended from the front surface of the cell. Such provision produces a variable bending moment in the lower portion of the front load cell plate, thereby compensating for the errors which will otherwise result.

It is, therefore, an object of the present invention to provide a load cell for measurement of the weight of off-center loads.

It is another object of the present invention to provide a load cell of parallelogram configuration which will retain the parallel relationship under load conditions.

Still another object of the present invention is to provide a load cell which supports the load entirely on structural elements thereof rather than on the indicating means.

Yet another object of the present invention is to provide a load cell which indicates the weight of an off-center load by an indication of deflection caused by the load thereon.

A further object of the present invention resides in the provision of novel load bearing structures in combination with a load cell for eliminating errors therein dependent upon the location of the load with respect thereto.

These and other objects, features and advantages of the present invention will be more fully realized and understood from the following detailed description when taken in conjunction with the accompanying drawings wherein:

FIGURE 3 is a front elevational view of another embodiment of the load cell of the present invention; and FIGURE 4 is a side elevational view of the load cell illustrated in FIGURE 3 with a mounting structure and a load-carrying structure shown in dotted lines thereon.

Like reference numerals throughout the various views of the drawings are intended to designate the same or similar structures.

Figure 1:
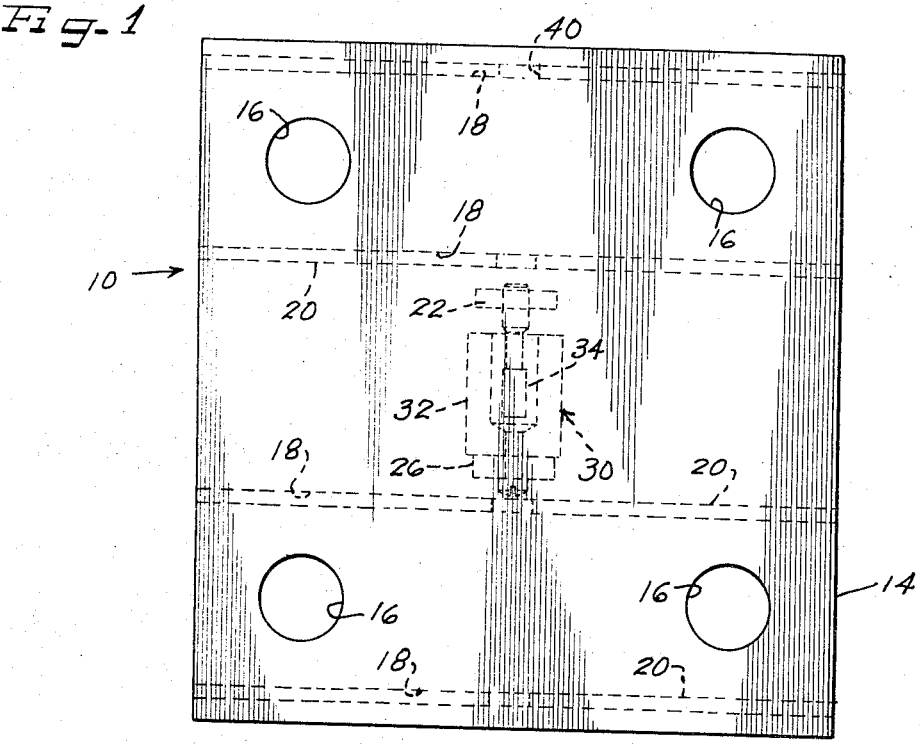
FIGURE 1 is a front elevational view of one preferred embodiment of the load cell of the present invention.
Figure 2:
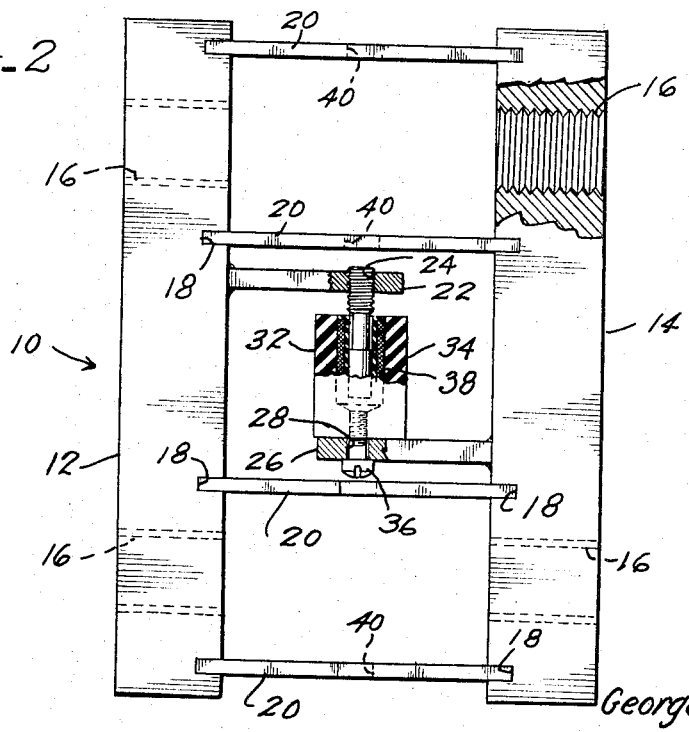
FIGURE 2 is a side elevational view partly in section of the load cell illustrated in FIGURE 1.

With reference to the drawings and in particular to FIGURES 1 and 2, there is shown one preferred form of a load cell of the present invention generally designated with the reference numeral 10. The load cell 10 includes a pair of bearing walls 12 and 14 which are preferably fabricated of cold finish steel. Each of the bearing walls 12, 14 include a plurality of threaded holes 16 for mounting of the load cell 10 between a stationary support and the load. It can be readily appreciated from the drawings that the bearing walls are relatively thick so as to support a considerable amount of weight thereon without any substantial bending resulting therein. Each of the bearing walls 12, 14 also include a plurality of grooves 18 in an inner face thereof. As shown in FIGURE 1, the grooves 18 extend the entire length of the walls 12, 14.

As more particularly shown in FIGURE 2, the load cell 10 includes a plurality of resilient members 20 which are received at their ends within respective grooves 18 and extend between the bearing walls 12, 14. The resilient members 20 have a length equal to the length of the bearing walls 12, 14. The resilient members 20 are preferably fabricated of cold rolled spring steel and are anchored into the grooves 18 by means of oven brazing or by welding.

It can be readily appreciated from the above description that if the bearing wall 12 were secured to a stationary support and a load fixed to the bearing wall 14, either directly or through a cantilever attached thereto, the bearing walls 12, 14 would retain the parallel relationship which exists under no load conditions. That is, if one bearing wall is deflected with respect to the other bearing wall by a force exerted at a point which will produce moments of force in the structure, the bearing walls 12, 14, will maintain the parallel relationship regardless of the moments of force exerted thereon.

A support member 22 extends from the inner face of the bearing wall 12 and is attached thereto preferably by means of a tack weld. The support member 22 includes a threaded hole 24 therein adjacent the extended end thereof. Another support member 26 extends from the bearing wall 14 and is also secured thereto by means of a tack weld. The support member 26 includes a hole 28 therein adjacent the extended end thereof. As shown in FIGURE 2, the hole 28 and the threaded hole 24 are in coaxial alignment with one another.

A differential transformer 30 includes a winding portion 32 and a movable slug 34. The winding portion 32 is secured to the support member 26 by means of a screw 36 extending through the hole 28 and engaging a threaded hole of the winding portion 32. The slug 34 is also threadably engaged with the hole 24 in the support member 22. The winding portion 32 includes a winding or set of windings 38 which are adapted for receiving the slug 34 therein. Movement of the slug 34 within the winding portion 32 changes the reluctance of the winding 38 to provide an indication of the displacement of the slug 34 within the winding 38.

Therefore, if one of the bearing walls is displaced relative to the other bearing wall, the core 34 will be displaced a like distance with respect to the winding portion 32. Such displacement of the slug 34 with respect to the winding portion 32 changes the reluctance of the winding 38 and provides an indication of such displacement by a measurement of the change in the reluctance.

The threaded end of the slug 34 includes a slot therein (not shown) for receiving a screw driver tip or similar instrument therein for adjusting the slug 34 with respect to the support member 22. Each of the resilient members 20 include a central hole 40 therein for receiving a screw driver shaft or similar instrument to allow installation and adjustment of the differential transformer 30.

It can be readily appreciated that the differential transformer 30 cannot and does not support any of the load which might be placed on one of the bearing walls 12, 14. Therefore, the entire load is supported between the two bearing walls 12, 14 by the resilient members 20. The differential transformer performs only to measure the deflection of one bearing wall with respect to the other. This structure and arrangement provides a distinct advantage not realized by the prior art in that, the presently known prior art employs a sensing device which senses the amount of load rather than the deflection caused thereby. That is, in the prior art devices which were of the parallelogram configuration, the resilient members provided very little support for the load and the sensing device supported substantially all of the load.

As a result of such structure and configuration, these prior known devices could not maintain the parallel configuration, since the resilient members could not be designed structurally to support any of the weight of the load. Without such structural strength in the resilient members, moments of force thereon resulted in the loss of the parallel relationship between the bearing walls. Any loss of this parallel relationship between the bearing walls, however, results in severe inaccuracies in the measurement of the weight of any loads placed on the device.

It can be readily appreciated, therefore, that the device of the present invention entirely overcomes these difficulties by the use of resilient members which support the entire weight of the load and a sensing device which senses only displacement of one bearing wall relative to the other rather than supporting any part of the load.

With reference to FIGURES 3 and 4, there is shown a second embodiment of the present invention which employs novel means for eliminating errors due to the variation in the placement of a load thereon. As shown, the load cell 10 includes a pair of bearing walls 50 and 52 with the wall 50 constituting the front fork-supporting wall and the wall 52 constituting the rear mounting wall of the load cell 10. The rear wall 52 includes a plurality of holes 54 therein for mounting the load cell 10 on a supporting structure.

This supporting and mounting structure is illustrated in dashed lines in FIGURE 4 and includes an upper clamp 56 having a plurality of threaded studs 58 extending therefrom and passing through the holes 54 in the upper portion of the wall 52. The clamp 56 is secured to the rear wall 52 by means of nuts 60 threadably engaging the studs 58. At a lower portion of the rear wall 52 is provided a clamp 62 which is secured to the rear wall 52 by means of a plurality of bolts 64 passing through the holes 54 and secured by means of nuts 66 thereto. A fork lift truck mounting plate or similar supporting structure is illustrated in dashed lines and indicated with the reference numeral 68. The clamps 56, 62 engage the mounting plate 68 for supporting the load cell 10 thereon.

The front bearing wall 50 includes a pair of flanges 69 and 70 at upper and lower ends thereof respectively for supporting fork members 71 thereon, shown in dashed lines. The upper flange 69 of the front bearing wall 50 includes a plurality of grooves 72 therein for receiving a locking member which may be spring biased with respect to the fork members 71. Such a locking member is shown in dashed lines in FIGURE 4 and indicated with the reference numeral 74. Therefore, the fork member 71 may be moved by sliding along the wall 50 to any one of a number of positions and retained in such positions by means of the locking member 74 engaging a respective groove 72.

The front bearing wall 50 includes a plurailty of grooves 76 therein extending the entire length of the wall along an inner surface thereof. Similarly, the rear bearing wall 52 includes a plurality of grooves 78 therein also extending the entire length of an inner surface thereof. A plurality of spring members 80 each have respective ends thereof disposed in respective grooves 76, 78 in the bearing walls 50, 52. The springs 80 also extend the entire length of the bearing walls 50, 52. Such arrangement of the bearing walls 50, 52 and the spring members 80 provides a parallel type of load cell for supporting a load on a supporting structure.

Secured in cantilever fashion to the inner surface of the bearing wall 50 is a support 82. A second support 84 is secured to and extends from an inner surface of the rear bearing wall 52. A differential transformer 86 is mounted between the two supports 82, 84 and includes a winding portion 88 fastened to the support 84, and a movable slug 90 secured to the support 82 and disposed within the winding portion 88. This arrangement of structures allows for the indication of any parallel deflection between the bearing walls 50, 52 induced by a load placed on the fork members 71. In all other respects, the load cell illustrated in FIGURES 3 and 4 is identical to the load cell illustrated in FIGURES 1 and 2.

Because the location of the fork members 71 may be displaced along the bearing wall 50, errors may arise in the indication of the load supported on the fork 71. Furthermore, distortion of the bearing walls 50, 52 with the application of a load on the forks 71 and manufacturing imperfections, will cause additional errors which require compensation. These and other errors which may result are compensated in the load cell of the present invention by the provision of a load bearing button 90 on the lower rear surface of the rear bearing wall 52 for engaging the fork truck mounting plate 68 and by the provision of a load bearing strip 92 on the lower front surface of the bearing wall 50 for supporting the forks 71 thereon. As illustrated, the load bearing button 90 is located substantially at a midpoint along the length of the bearing wall 52. The load bearing strip 92, as illustrated in FIGURE 3, is slightly curved such that the strip 92 extends along the length of the bearing wall 50 in an upwardly sloping direction from a midpoint to respective ends thereof. Therefore, if one of the forks 71 is positioned at or near a vertical centerline through the bearing wall 50, while the other fork 71 is positioned near one end of the bearing wall 50, an indication of the weight of the load will not be effected and will be identical to a reading taken of a load which is balanced with respect to the vertical centerline of the load cell 10.

The position of the bearing strip 92 on the bearing wall 50 and the curvature of the strip will be dependent upon the imperfections inherent in the load cell 10. Therefore, the position and curvature of the bearing strip 92 are variable with each particular load cell and are determined and fixed at the time of manufacture of the load cell.

Therefore, when it is necessary to employ the forks 71 in various positions on the load cell 10, errors will arise between the indication of the load at one position of the forks 71 and another position thereof. The bearing button 90 and bearing strip 92 eliminate such errors by altering the respective moments of force exerted on the bearing walls 50, 52 by the load. Such alterations of the moments of force is realized by the bearing strip 92 supporting the forks 71 at an extreme lower point when the fork is in the center of the load cell 10 and at a higher point when the fork is moved toward an edge of the load cell 10. The displacement of the two bearing walls 50, 52 will remain identical for loads which are not in balance on the load cell 10 and the differential transformer will provide an exact indication of the load regardless of its respective position.

It will be apparent that many modifications and variations may be effected without departing from the scope of the novel concepts of the present invention.

What is claimed is:
1. A load cell comprising
   (a) a pair of bearing walls in parallel spaced relationship to one another,
   (b) means for maintaining said walls in the parallel relationship during displacement of one wall relative to the other wall,
   (c) means for measuring the displacement of said one wall relative to said other wall, and
   (d) a force transmitting member supported at one end thereof on one end of one wall and having intermediate points overlapping a surface of said one wall and having the other end thereof extending in cantilever relationship from said one wall for receiving a force thereon which is directed substantially perpendicular thereto, and
   (e) a bearing member on said surface of said wall for supporting said force transmitting member at at least one of said intermediate points when placed at a centerline of said one wall at a point on said surface of said wall which is lower than when placed at any other position on said one wall.

2. The load cell as defined in claim 1 wherein said supporting means includes a bearing strip secured to said one wall.

3. The load cell as defined in claim 2 wherein said bearing strip extends over a surface of said one wall with a central portion thereof disposed at a fixed distance from a lower end of said one wall at a centerline thereof and with the remaining portions thereof disposed at distances greater than the fixed distance from the lower end of said one wall.

4. The load cell as defined in claim 2 wherein said bearing strip is substantially arcuately shaped and disposed on said one wall with a midpoint thereof in adjacent relationship to a lower end of said one wall at a centerline thereof.

5. A load cell for supporting a load thereon in cantilevered relation which tends to produce undesired torsional forces therein, comprising
   (a) a pair of plates disposed in spaced parallel relationship to one another,
   (b) a force receiving member extending substantially orthogonally from said one plate, one of said plates being adapted for supporting the load thereon with the force of the load extending substantially parallel and bearing on said force receiving member and the other of said plates being adapted for stationary mounting,
   (c) means for supporting all of the forces created by the load which are transmitted from said one plate to said other plate comprising a plurality of spring members each extending from said one plate to said other plate in spaced parallel relationship to one another and having sufficient strength to support all of the forces transmitted to said other plate and to provide maximum resistance to the undesired torsional forces created by the load which tend to destroy the parallel relationship between said plates, and (d) means for measuring the displacement of said plates with respect to one another created by the forces of the load without impeding movement of said plates with respect to one another.

6. A load cell as defined in claim 5, wherein said measuring means is a differential transformer having a coil and a core secured to a respective one of said plates.

7. A load cell for supporting a load thereon in cantilevered relation which tends to produce undesired torsional forces therein comprising (a) a pair of plates disposed in spaced parallel relationship to one another, one of said plates being adapted for supporting a fork in cantilevered relationship thereon, with the force of a load supported on the fork being transmitted to said one plate, (b) means for supporting all of the forces created by the load which are transmitted from said one plate to said other plate comprising a plurality of spring members each extending from said one plate to said other plate in spaced parallel relationship to one another and having sufficient strength to support all of the forces transmitted to said other plate and to provide maximum resistance to the undesired torsional forces created by the load which tend to destroy the parallel relationship between said plates, and (c) means for measuring the displacement of said plates with respect to one another creased by the forces of the load without impeding movement of said plates with respect to one another.

8. A load cell as defined in claim 7, wherein said measuring means is a differential transformer having a coil and a core secured to a respective one of said plates.

9. A load cell adapted for insertion between a fork lift and the forks comprising, (a) a pair of bearing walls in parallel spaced relationship to one another, (b) means for maintaining said walls in the parallel relationship during displacement of one wall relative to another wall, (c) means for measuring the displacement of said one wall relative to the other wall, and (d) means on one wall for supporting forks so that the lower end of a fork placed at the centerline of the load cell on said wall is supported at a point lower than a fork placed at any other position on the cell.

References Cited

UNITED STATES PATENTS 2,822,095  2/1958  Buckingham _____ 73—141
3,024,648  3/1962  Webster _____ 73—141

RICHARD C. QUEISSER, *Primary Examiner.*

J. D. SCHNEIDER, *Assistant Examiner.*